Feb. 26, 1963
R. T. FENN
3,078,657
IGNITION SYSTEM FOR THE AFTERBURNER
OF AN AIRCRAFT ENGINE
Filed Feb. 28, 1956
2 Sheets-Sheet 1
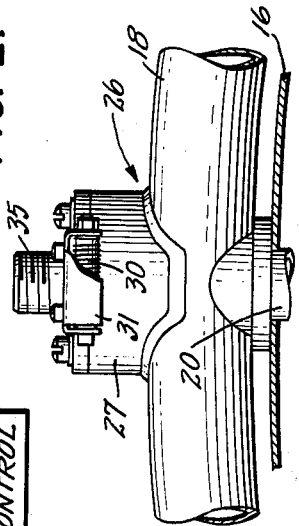
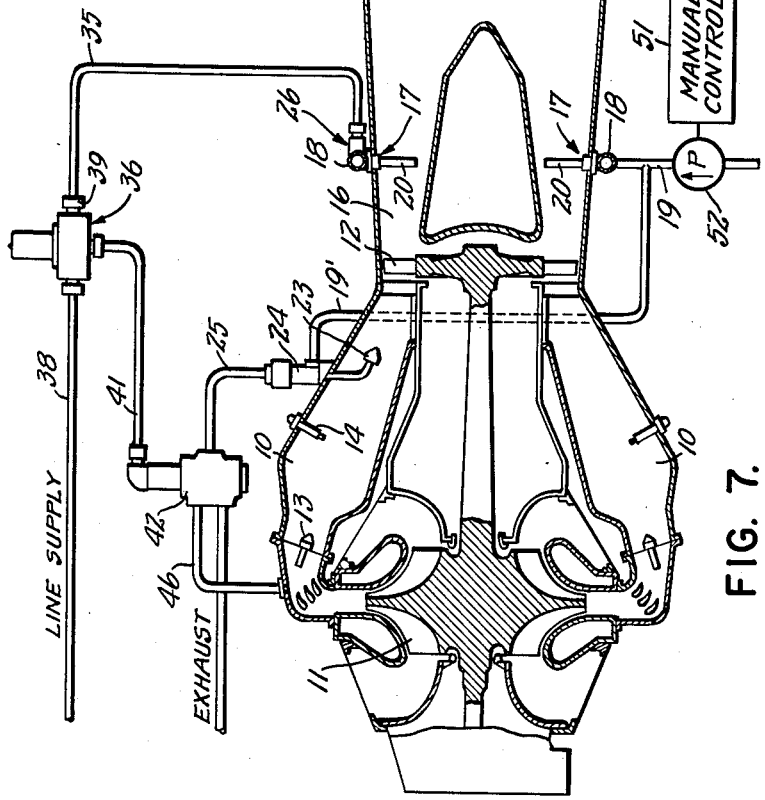
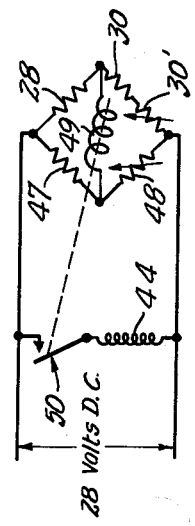
INVENTOR.
RAYMOND T. FENN
BY
Mitchell Bechert
ATTORNEYS INVENTOR.
RAYMOND T. FENN
BY
*Mitchell & Bechert*
ATTORNEYS United States Patent Office 3,078,657
Patented Feb. 26, 1963

3,078,657
IGNITION SYSTEM FOR THE AFTERBURNER
OF AN AIRCRAFT ENGINE
Raymond T. Fenn, Pleasant Valley, Conn., assignor to
The New Britain Machine Company, New Britain,
Conn., a corporation of Connecticut
Filed Feb. 28, 1956, Ser. No. 568,272
12 Claims. (Cl. 60—35.6)

My invention relates to jet engines for aircraft, and in particular to improved means for igniting afterburners for such engines.

The purpose of an afterburner is to augment the propulsive thrust of a given aircraft reaction motor, such as a turbojet, ramjet, rocket or piston engine, in order to obtain greater speed and maneuverability of the aircraft under certain situations. These situations may exist at varying speeds and under rapidly changing altitude and atmospheric conditions. In any event, it is extremely important that afterburner-fuel ignition be positively responsive to pilot action under all conditions. Such ignition can take place only if, at the time the igniter is fired, ignitable fuel has been suitably mixed with oxygen and is present in the afterburner combustion chamber. The length of time required to fill the afterburner system with a combustible mixture varies with certain changing conditions, particularly altitude. Also, the length of time required for the afterburner igniter to respond to pilot action may vary, so that it is difficult, if not impossible, for the pilot himself to predict when afterburner ignition can be assuredly established.

The above-mentioned factors often result in exhausting the flame propagated from the igniter before the afterburner fuel mixture has had a chance to diffuse properly into the afterburner combustion chamber. In that event, the afterburner fuel is not ignited because, in the case of a turbojet (or the exhaust from a piston engine), the exhaust gases may not be hot enough to spontaneously ignite the afterburner fuel. There is thus a loss of unburned fuel with resultant loss in augmented propulsive thrust. The pilot must then shut off the afterburner system and attempt to restart the afterburner in a recycling process. If the pilot has to recycle at all, not only is precious fuel wasted, but in a combat maneuver, the time delay may be disastrous to the pilot and to the aircraft.

It is, accordingly, an object of the invention to provide improved ignition means for an afterburner of the character indicated.

It is another object to provide an automatic igniter for an afterburner which will be responsive to the delivery of fresh fuel to the afterburner fuel injector before setting off the igniter.

It is a specific object to achieve the above objects with a device responding to instantaneous temperature of injected fuel for the afterburner, said temperature being evaluated against an afterburner ambient temperature, whereby the relatively cold temperature of the new charge of afterburner fuel may be utilized to set off the igniter.

Other objects and various further features of novelty and invention will become apparent or will occur to those skilled in the art from a reading of the following specification in conjunction with the accompanying drawings. In said drawings, which show, for illustrative purposes only, a preferred form of the invention:

FIG. 1 is a simplified longitudinal sectional view through a turbojet engine to which an afterburner has been connected, and the drawing schematically shows fuel-injection and ignition controls for the afterburner;

FIG. 2 is a side view of the unit employed to sense temperature of the injected fuel;

FIG. 7 is a circuit diagram of electrical elements in FIG. 1.

Figure 3:
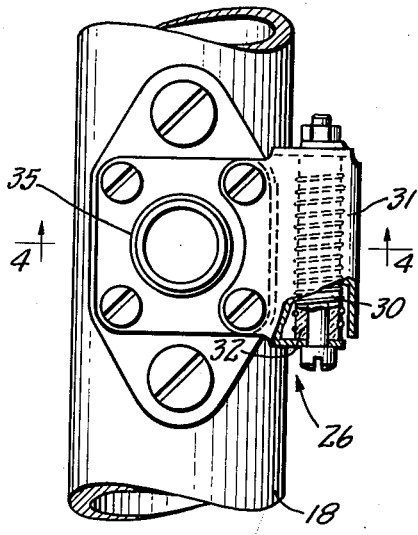
FIG. 3 is an enlarged top view of the unit of FIG. 2.

Briefly stated, my invention contemplates an afterburner incorporating near its upstream end a fuel-injection system including, near the point of fuel injection, means responsive to a change in temperature of fuel at the injector. When the primary engine has been continuously running without the employment of the afterburner, there will be no fuel flow at the afterburner injector, and therefore the element which responds to fuel temperature will reflect substantially ambient temperature at the afterburner; the temperature-responsive device includes a further heat-responsive element responsive always to ambient temperature at the afterburner, and the two heat-responsive elements are connected for differential evaluation. When the pilot decides to set off combustion in the afterburner, he need only initiate fuel flow into the afterburner combustion chamber; the fuel thus supplied will be derived from the fuel supply and therefore will be at a relatively cold temperature (i.e., much less than afterburner ambient temperature). After the afterburner fuel flow has started, and by the time a given differential-temperature threshold has been crossed, an adequate charge of fuel will have been diffused into the afterburner combustion chamber, so that automatic operation of the igniter will be timely, and there will be no blowout and no waste of afterburner fuel.

Referring to FIG. 1 of the drawings, my invention is shown in application to a turbojet engine including a combustion-chamber means 10 served by a compressor 11 at the upstream end and exhausting at the downstream end through a turbine 12. Conventional fuel-injection means 13 and ignition means 14 are provided in the combustion-chamber means 10. An afterburner including combustion chamber 15 may be connected by a diffuser section 16 to the exhaust outlet of the turbojet engine, and fuel-injection means 17 for the afterburner may be located at the upstream end of the afterburner, that is, near the exhaust outlet of the primary engine as shown.

The fuel-injection means for the afterburner may comprise an annular manifold 18 extending peripherally around the outside of the afterburner and is served by a fuel-supply line 19. Injection is accomplished at a plurality of angularly spaced locations through injection nozzles 20 communicating from the manifold 18 radially into the upstream end of the afterburner, so that raw fuel injected at nozzles 20 may have a chance to diffuse into and mix with unburned oxygen exhausting from the primary engine before reaching the combustion-chamber region 15. Flame-holding means 21 serves to anchor combustion within the afterburner combustion chamber 15.

In accordance with the invention, I provide means for automatically detecting the presence of relatively cold new fuel at the injector means 17 and so connected to ignition means for the afterburner as to set off the same only when the new fuel charge has actually been substantially introduced into the chamber 15. In the form shown, the igniter for the afterburner is, in reality, an auxiliary fuel injector comprising a nozzel 23 located upstream from the injection means 17 by an amount sufficient to permit ignition from the burning gases of the primary engine. Thus, in the form shown, the injection nozzle 23 is located within and preferably near the downstream end of the turbojet combustion chamber 10. The igniter further comprises automatic control means 24 for transiently injecting a charge of raw fuel from the fuel-supply line 19; control means 24 will be understood to comprise an actuator cylinder with pneumatic means 25 for operating the same.

Figure 4:
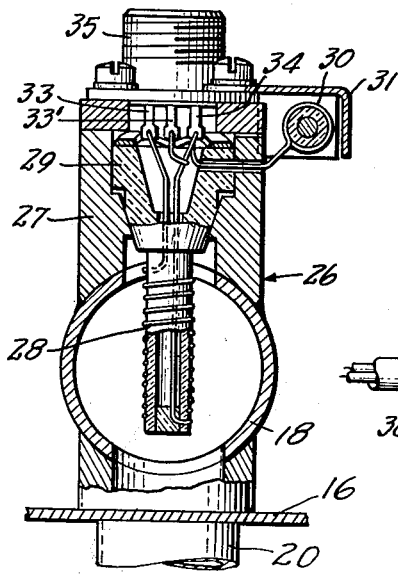
FIG. 4 is a sectional view, taken on the plane 4—4 of FIG. 3.

Automatic detection of fresh cold fuel at the injector means 17 may be accomplished at what I term a liquid-sensor unit 26, shown best in FIGS. 2, 3 and 4.

Figure 6:
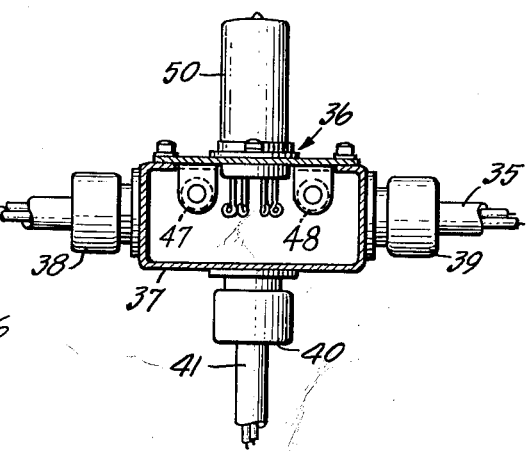
FIG. 6 is a side view of the relay control for the valve of FIG. 5.

This unit is shown to comprise a body 27 secured directly to the manifold 18, preferably at a location substantially diametrically opposed to the location at which the primary fuel-supply connection 19 is established. Within the body 27, a first thermally responsive electrical element 28 is suitably supported for direct exposure to fuel within the manifold 18; in the form shown, the element 28 is a short helical development of electrical resistance wire on the stem of a suitable refractory insulating support member 29. The liquid-sensor unit further includes a second electrical resistance element 30 exposed to ambient temperatures just external of the afterburner and shown protected within an open hood or bracket 31, secured to the outer end of the body 27. The element 30 may again be a short helical development of resistance wire on an insulating base 32. In the form shown, the electrical connections to the elements 28—30 are combined into a three-wire system including terminals 33—33'—34, for passage through conduit means 35 to a control-relay assembly 36, best shown in FIG. 6; in FIG. 6, wiring connections have been omitted for simplification.

Figure 5:
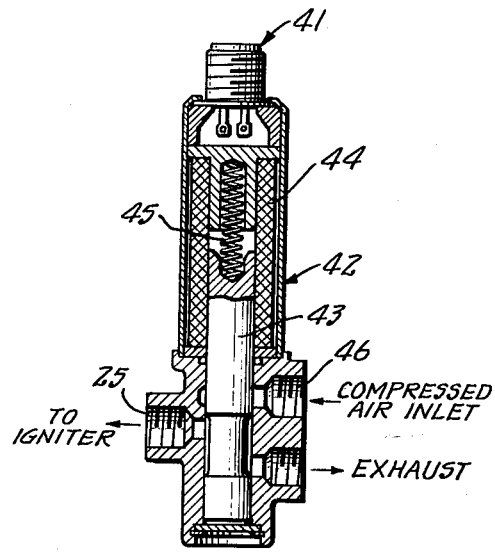
FIG. 5 is a sectional view of a solenoid-operated pneumatic valve forming part of FIG. 1.

The control-relay assembly 36 may be based on a junction box 37 having a first connection 38 to a source of external electrical supply, and a second connection 39 to the liquid sensor by way of the conduit 35. An output connection 40 carries control signals in a conduit 41 to a pneumatic-valve assembly 42 (best shown in FIG. 5) for controlling the igniter 24.

The pneumatic valve 42 may include a spool-valve member 43 having an extended upper part constituting an armature element of solenoid means 44; a spring 45 assures that, in the absence of solenoid excitation, the valve 43 will be positioned to exhaust the igniter-control means 24. However, when the solenoid 44 is excited, the valve 43 will be shifted to admit compressed air from the inlet 46 direct to the igniter control 24. Compressed air may be derived in line 46 from the compressor end of the combustion chamber 10.

As indicated generally above, the temperature-responsive electrical elements 28—30 are differentially evaluated to determine whether the igniter 24 shall be operated. For the arrangement shown, this is achieved in a normally balanced electrical bridge in which the elements 28—30 form a first pair of arms. A trimming resistor 30' is additionally shown in the arm 30, and preset reference resistors 47—48 mounted in the relay assembly 36 are shown in the other pair of arms. The bridge is excited from the available electrical supply, in line 38, and the coil 49 of the control relay 50 is excited across the other corners of the bridge. Relay 50 is preferably of the normally open variety so that, when the bridge is balanced, meaning that both the indicated fuel temperature and the ambient temperature are substantially the same, the relay 50 is not operated. However, upon detection of cold raw fuel at the injection means, the bridge is unbalanced, and relay 50 closes to energize the solenoid 44; this immediately operates the compressed-air control valve 43 governing igniter operation.

In operation, the pilot need not concern himself at all with the operation of the afterburner beyond merely deciding when and whether the afterburner is to be operated. Upon making this decision, he need only operate manual control means 51, determining the admission of fuel to the afterburner injector 17 and to the igniter control 24; in the form shown, auxiliary pumping means 52 is operated to deliver afterburner fuel. The differential thermostat will not detect the new charge of afterburner fuel until the manifold 18 has been completely filled with cold fuel and, therefore, until a very substantial charge of fuel has assuredly been introduced into the afterburner combustion chamber 15. The temperature difference will be immediately apparent to the liquid sensor, so that the control mechanisms 36—42—24 may all function substantially immediately upon indication of the desired temperature difference. Once the igniter 24 has been operated, a transient fuel charge, with accompanying rich flame, will be passed through the turbine to the afterburner combustion chamber, and afterburner combustion will be assured.

Depending upon the particular afterburner and primary engine with which it is used, various sensitivity settings will be found desirable in the thermally responsive device 26—36. The trimming resistor 30' provides a means of adjusting the relative magnitude of temperature differences for which the relay 50 is to be operated, it being understood, of course, that for any given adjustment at 30', the corresponding reference resistor 48 will have been similarly adjusted to assure bridge balance for normal burning, that is, for the condition in which the afterburner is not to be operated.

It will be seen that I have described a simple and yet relatively fool-proof mechanism for assuring ignition within an afterburner. My arrangement is continually in readiness for operation whenever the pilot demands it. Because my mechanism operates in response to a determination that cold fuel has reached the most remote part of the fuel-supply system, I know that, when the igniter 24 is operated, the combustion chamber is loaded with a combustible mixture. Combustion is thus assured, regardless of flight conditions.

While I have described the invention in detail for the preferred form shown, it will be understood that modifications may be made within the scope of the invention as described in the claims which follow.

I claim:

1. In combination, a reaction motor including a combustion chamber and an exhaust outlet, an afterburner combustion chamber communicating with said exhaust outlet, fuel injection means for said afterburner combustion chamber and located downstream from the exhaust outlet of said turbojet combustion chamber, igniter means for said afterburner combustion chamber and so disposed with reference to said fuel-injection means as to provide ignition for fuel injected thereby, first heat-responsive means located within said fuel-injection means and responsive to the temperature of fuel at said fuel-injection means, second temperature-responsive means located adjacent a part of said afterburner combustion chamber and responsive to ambient temperature at said afterburner combustion chamber, control means for supplying fuel to said fuel-injection means, and automatic means responsive to a temperature difference determined by differential evaluation of both said temperature-responsive means and connected in controlling relation with said igniter means.

2. In combination, a reaction motor including a combustion chamber and an exhaust outlet, an afterburner combustion chamber connected to said exhaust outlet, fuel-injection means located at an upstream part of said afterburner combustion chamber, a manual control for selectively controlling the admission of fuel to said fuel-injection means, igniter means for fuel injected at said fuel-injection means and so disposed with reference to said fuel-injection means as to provide ignition for fuel injected thereby, and means differentially responsive to fuel temperatures at said injection means and to afterburner ambient temperature and in controlling relation with said igniter means, said last-defined means including a first thermostatic element exposed to fuel within said fuel-injection means and a second thermostatic element located adjacent a part of said afterburner combustion chamber.

3. In combination, a self-contained reaction motor including a combustion chamber and an exhaust outlet, an afterburner combustion chamber connected to said exhaust outlet, fuel-injection means for said afterburner combustion chamber and located near an upstream part of said afterburner combustion chamber, a manual control for selectively controlling the admission of fuel to said fuel-injection means, igniter means for fuel injected at said fuel-injection means and so disposed with reference to said fuel-injection means as to provide ignition for fuel injected thereby, and thermostatic means differentially responsive to fuel temperature within said injection means and to afterburner ambient temperature and in controlling relation with said igniter, said differentially responsive means being balanced in non-actuating relation with said igniter under conditions in which the detected fuel temperature approximates afterburner ambient temperature, whereby, upon injection of cold fresh fuel at said fuel-injection means, the detected relatively cold fresh-fuel temperature will establish a temperature difference with afterburner ambient temperature to instantaneously control said igniter.

4. In combination, a reaction motor including a combustion chamber and an exhaust outlet, first fuel injection means in said combustion chamber, whereby under normal cruising conditions, combustion may substantially completely take place within said turbojet combustion chamber, an afterburner combustion chamber connected to said exhaust outlet, fuel-injection means for said afterburner combustion chamber and located downstream from said exhaust outlet, an igniter for said afterburner combustion chamber comprising a further fuel injector upstream from said afterburner fuel-injection means, said igniter including valve means for transiently injecting a raw fuel charge into the burning gases of said turbojet engine, whereby a transient flame is passed downstream in said afterburner, and control means for said igniter-valve means comprising thermally responsive means responsive to a change in detected temperature difference between the temperature of fuel being injected in said afterburner fuel injection means and ambient temperature immediataely external to said afterburner combustion chamber at the location of said afterburner fuel-injection means, the control connection between said control means and said igniter-valve means being such as to admit a fresh-fuel charge to said igniter upon detection of said change in temperature difference.

5. The combination of claim 4, in which the connection of said afterburner combustion chamber to said exhaust outlet comprises a diffusion chamber, said afterburner fuel-injection means being located in said diffusion chamber.

6. The combination of claim 4, in which said further injector of said igniter is located near the downstream end of said turbojet combustion chamber.

7. In combination, a reaction motor including a combustion chamber and an exhaust outlet, an afterburner combustion chamber connected to said exhaust outlet, fuel-injection means for said afterburner combustion chamber at the upstream end thereof, controllable igniter means for said afterburner combustion chamber and so disposed with reference to said fuel-injection means as to provide ignition for fuel injected thereby, and differential temperature-responsive means for controlling said igniter; said last-defined means comprising an electrical bridge including a first thermally responsive electrical-resistance element directly exposed to cold fuel within said fuel-injection means, and a second thermally responsive electrical-resistance element at said fuel-injection means, but exposed to ambient temperature immediately external of said afterburner combustion chamber, said resistance elements being disposed in separate arms of said bridge, and said bridge being balanced so as not to operate said igniter when said first-mentioned element is substantially at the temperature of said second mentioned element, whereby, upon introduction of fresh cold fuel to said fuel-injection means, said first resistance element may respond to the relatively cold raw fuel to unbalance said bridge and operate said igniter.

8. In combination, a turbojet reaction motor comprising a combustion chamber, a turbine at the downstream end of said combustion chamber, a compressor at the upstream end of said combustion chamber, an afterburner combustion chamber connected to the discharge end of said turbine, fuel-injection means for said afterburner combustion chamber and located downstream from said turbine, igniter means for said afterburner combustion chamber comprising an auxiliary fuel injector in said turbojet combustion chamber, and pneumatically operated means for introducing a transient discharge of raw fuel at said auxiliary fuel injector, a compressed-air supply connection from said compressor, valve means connected to said connection and to said pneumatically operated means and in controlling relation with compressed air delivered to said pneumatic means, and means including an electrical bridge for operating said valve means, said electrical bridge including separate resistance elements, one of which is responsive to fuel temperature within said fuel-injection means and the other of which is responsive to ambient temperature, the connection from said bridge to said valve means being such as to admit a fresh-fuel charge to said auxiliary fuel injector upon bridge response to a change in temperature detected by said one resistance element.

9. The combination of claim 8, in which the connection from said bridge to said valve means includes a relay responsive to bridge unbalance and in controlling relation with said valve means.

10. In combination, a turbojet reaction motor comprising a combustion chamber, a turbine at the downstream end of said combustion chamber, a compressor at the upstream end of said combustion chamber, an afterburner combustion chamber connected to the discharge end of said turbine, fuel-injection means for said afterburner combustion chamber and located downstream from said turbine, manual control means for supplying fuel to said fuel-injection means, igniter means for said afterburner combustion chamber comprising an auxiliary fuel injector in said turbojet combustion chamber, pneumatically operated means for introducing a transient discharge of raw fuel into said turbojet combustion chamber at said auxiliary fuel injector, a compressed-air supply connection from said compressor, valve means connected to said connection and to said pneumatically operated means and in controlling relation with compressed air delivered to said pneumatic means, and electrically operated control means for said valve means, said electrically operated means including thermally responsive means within said fuel-injection means and responsive to a change in temperature of fuel supplied to said afterburner, the control sense of said thermally-responsive means being to operate said valve means for injection of a fuel charge at said auxiliary fuel injector upon detection of said change in temperature.

11. In combination, a turbojet reaction motor comprising a combustion chamber, a turbine at the downstream end of said combustion chamber, a compressor at the upstream end of said combustion chamber, an afterburner combustion chamber connected to the discharge end of said turbine, fuel-injection means discharging into said afterburner combustion chamber and located downstream from said turbine, igniter means for said afterburner combustion chamber comprising an auxiliary fuel injector discharging into said turbojet combustion chamber, pneumatically operated means for introducing a transient discharge of raw fuel at said auxiliary fuel injector, a compressed-air supply connection from said compressor, valve means connected to said connection and to said pneumatically operated means and in controlling relation with compressed air delivered to said pneumatic means, and control means for said valve means including a thermally responsive element exposed to fuel within said fuel-injection means, the control sense of said thermally responsive element being to operate said valve means for injection of a fuel charge at said auxiliary fuel injector upon detection of a change in temperature within said fuel-injection means.

12. In combination, a reaction motor including a combustion chamber and an exhaust outlet, an afterburner combustion chamber connected to said exhaust outlet, fuel-injection means discharging into said afterburner combustion chamber, an igniter so disposed with reference to said fuel-injection means as to provide ignition for fuel injected thereby, and control means for said igniter including a thermally responsive element exposed to fuel within said fuel-injection means, the control sense of said thermally responsive element being to operate said igniter upon detection of a change in temperature at said fuel-injection means.

References Cited in the file of this patent

UNITED STATES PATENTS

| | | |
|---|---|---|
| 2,041,014 | Norton | May 19, 1936 |
| 2,427,178 | Aubert | Sept. 9, 1947 |
| 2,431,241 | Godsey | Nov. 18, 1947 |
| 2,543,588 | Nelson | Feb. 27, 1951 |
| 2,750,734 | Anxionnaz et al. | June 19, 1956 |
| 2,769,121 | Rogoff | Oct. 30, 1956 |
| 2,808,699 | Ivens et al. | Oct. 8, 1957 |
| 2,819,587 | Coar | Jan. 14, 1958 |